United States Patent
Inoue et al.

(10) Patent No.: US 7,124,285 B2
(45) Date of Patent: Oct. 17, 2006

(54) PEAK POWER REDUCTION WHEN UPDATING FUTURE FILE

(75) Inventors: Ryo Inoue, Austin, TX (US); Juan G. Revilla, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 573 days.

(21) Appl. No.: 09/823,276

(22) Filed: Mar. 29, 2001

(65) Prior Publication Data

US 2002/0144100 A1 Oct. 3, 2002

(51) Int. Cl.
*G06F 15/00* (2006.01)

(52) U.S. Cl. ....................................... 712/228
(58) Field of Classification Search ................ 712/218, 712/228; 713/300, 600
See application file for complete search history.

(56) References Cited

U.S. PATENT DOCUMENTS

| | | | | |
|---|---|---|---|---|
| 5,155,817 A | * | 10/1992 | Kishigami et al. | 712/218 |
| 5,535,346 A | * | 7/1996 | Thomas, Jr. | 712/217 |
| 5,629,698 A | * | 5/1997 | De Wit | 341/118 |
| 5,654,929 A | * | 8/1997 | Mote, Jr. | 365/222 |
| 5,758,112 A | * | 5/1998 | Yeager et al. | 712/217 |
| 5,872,951 A | * | 2/1999 | Tran | 712/218 |
| 5,915,110 A | * | 6/1999 | Witt et al. | 712/239 |
| 6,018,798 A | * | 1/2000 | Witt et al. | 712/220 |
| 6,112,018 A | * | 8/2000 | Tran et al. | 712/202 |
| 6,112,296 A | * | 8/2000 | Witt et al. | 712/222 |
| 6,112,310 A | * | 8/2000 | Jun et al. | 713/501 |
| 6,205,541 B1 | * | 3/2001 | Tran et al. | 712/217 |
| 6,615,343 B1 | * | 9/2003 | Talcott et al. | 712/244 |
| 6,898,695 B1 | * | 5/2005 | Anderson et al. | 712/218 |

OTHER PUBLICATIONS

Ozer et al., A Fast Interrupt Handling Scheme for VLIW Processors, Proceedings of the International Conference on Parallel Architectures and Compilation Techniques, Oct. 1998, p. 136-141.*
Smith et al., Implementing Precise Interrupts in Pipelined Processors, IEEE Transactions on Computers, May 1988, p. 562-573.*
InstantWeb. "Free On-line Computing Dictionary". ©1995. Search term: static randcom access memory http://www.instantweb.com/foldoc/foldoc.cgi?static+random+access+memory.*
Translation of Feb. 2, 2005 Office Action in Taiwan prosecution of Application No. 091105736.

* cited by examiner

*Primary Examiner*—Eddie Chan
*Assistant Examiner*—Aimee J. Li
(74) *Attorney, Agent, or Firm*—Fish & Richardson P.C.

(57) ABSTRACT

In one implementation, a programmable processor is adapted to include a first set of registers and a second set of registers. The first set of registers may have a future file, and the second set of registers may be architectural registers. Following a termination of an instruction in the processor, the future file may be restored with values in the second set of registers. The future file is restored over more than one clock cycle.

21 Claims, 6 Drawing Sheets

US 7,124,285 B2

PEAK POWER REDUCTION WHEN UPDATING FUTURE FILE

TECHNICAL FIELD

This invention relates to future files implemented in a programmable processor.

BACKGROUND

Conventional programmable processors, such as digital signal processors include a variety of hardware designed to improve performance of the processor and increase the speed at which software instructions are executed. The additional hardware, however, typically increases the power consumption of the processor.

"Pipelining" is a technique used in conventional programmable processors in which instructions are overlapped in execution in order to increase overall processing speed. A pipelined processor typically processes instructions in a number of stages. An instruction moves from one stage to the next according to a system clock, which typically has a clock rate determined by the slowest stage in the pipeline.

While processing instructions, "hazards," sometimes prevent the next instruction in the instruction stream from executing. For example, a data hazard may arise when an instruction depends on the results of a previous instruction that has not finished processing within the pipeline. Only when an instruction has finished being processed within the pipeline are its results written to architectural registers, where the results are generally accessible to subsequent instructions in the pipeline. Data Hazards, therefore, may cause the pipeline to "stall" and reduce the pipeline's performance.

DESCRIPTION

Figure 1:
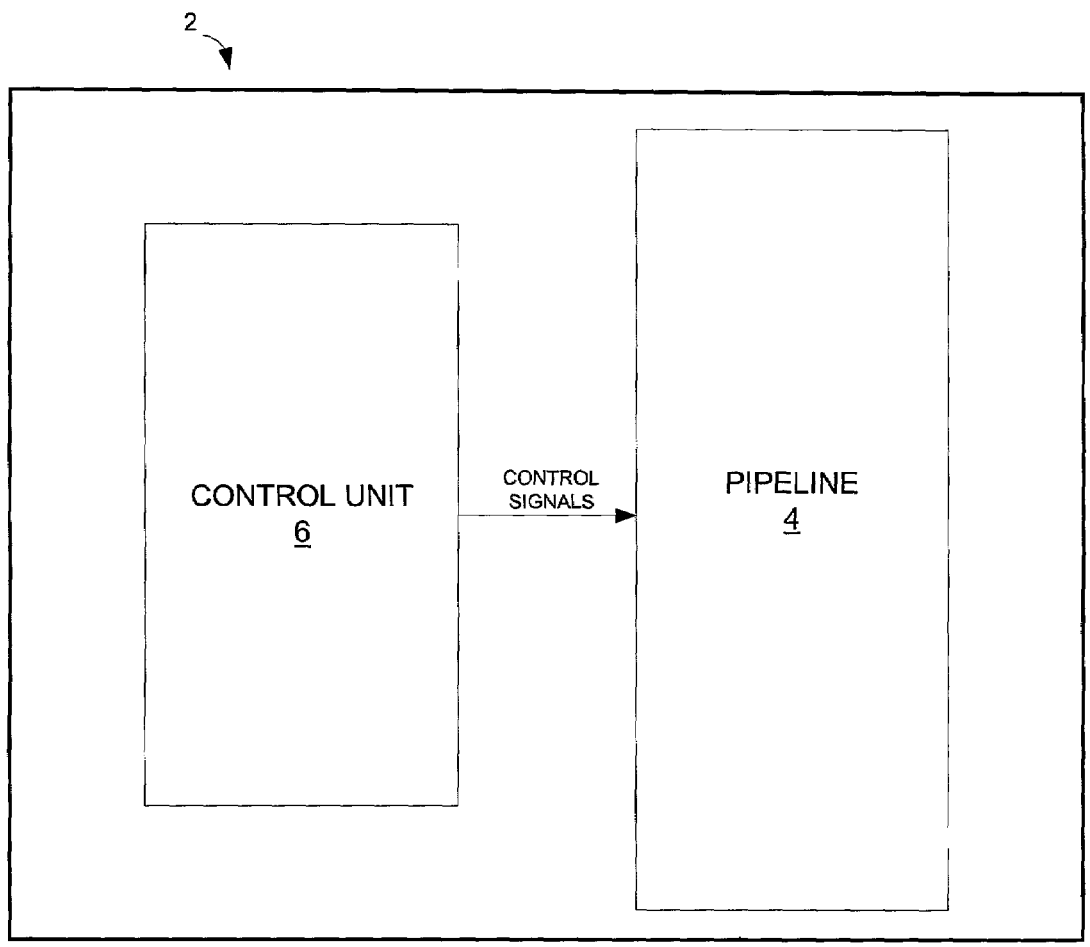
FIG. 1 is a block diagram illustrating a programmable processor according to an embodiment of the invention.

FIG. 1 is a block diagram illustrating a programmable processor 2. The processor 2 may include a pipeline 4 and a control unit 6. The control unit 6 may control the flow of instructions and/or data through the pipeline 4 according to a system clock. For example, during the processing of an instruction, the control unit 6 may direct the various components of the pipeline 4 to decode the instruction and correctly perform the corresponding operation including, for example, writing the results back to memory.

Instructions may be loaded into a first stage of the pipeline 4 and processed through subsequent stages. A stage may process concurrently with the other stages. Data may pass between the stages in the pipeline 4 during a cycle of the system. The results of an instruction may emerge at the end of the pipeline 4 in rapid succession.

The processor 2 may include one or more architectural registers that may store the results of one or more instructions that have finished being processed in the pipeline 4. In addition, the processor 2 may include a future file. The future file may include one or more speculative registers that are used to store speculatively generated or predicted values. As described in detail below, in some instances, the future file may require restoration. Restoration involves adjusting the speculatively generated or predicted register values to reflect the current architectural register values. To efficiently restore the future file, the processor 2 may implement one or more of the peak power saving techniques described herein.

Figure 2:
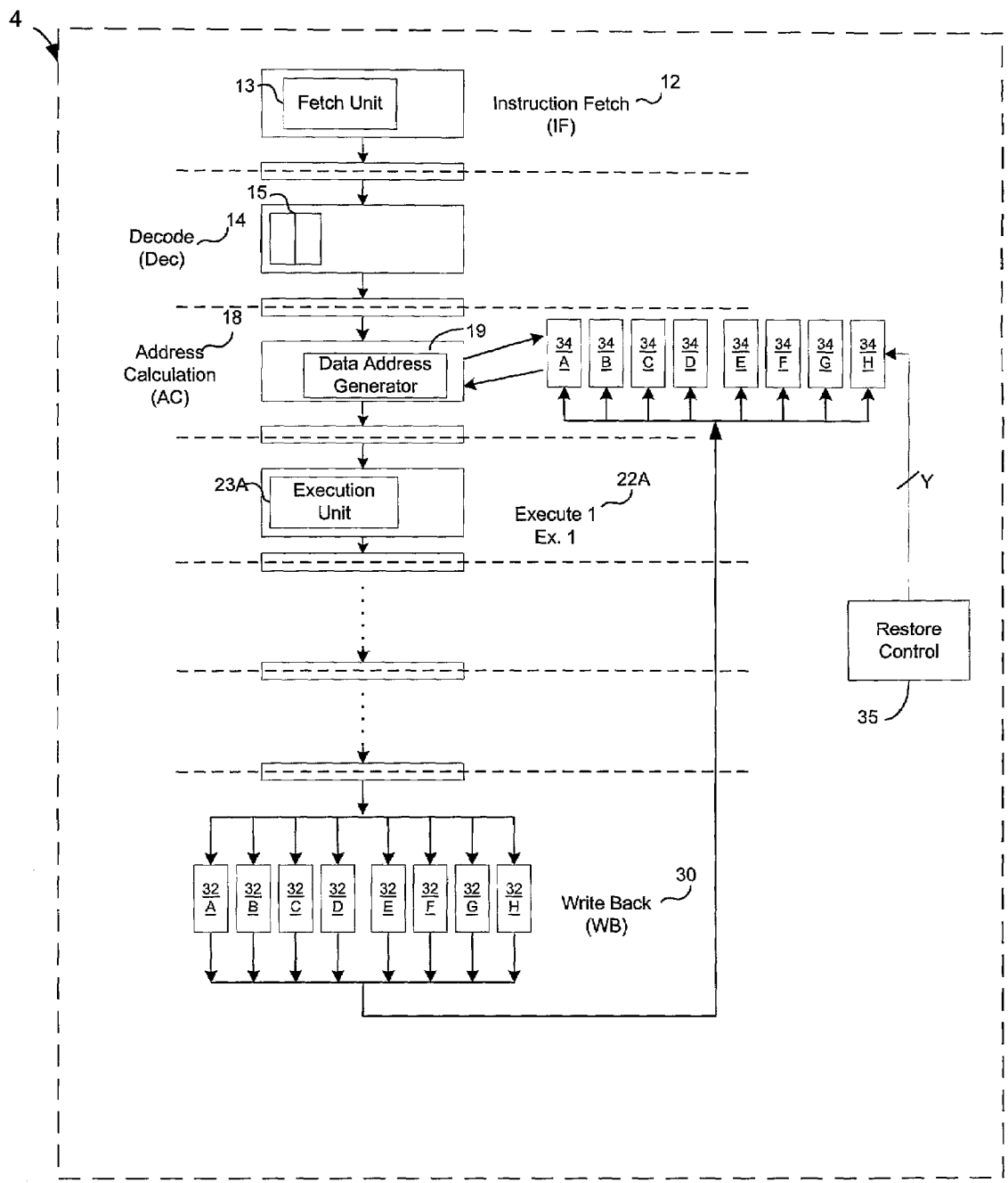
FIG. 2 is a block diagram illustrating an example pipeline according to an embodiment of the invention.

FIG. 2 is a block diagram illustrating an example pipeline 4. The pipeline 4 has multiple stages that may facilitate execution of multiple instructions concurrently. In the pipeline 4, an instruction may enter an instruction fetch (IF) stage 12 during a first clock cycle. The instruction may then continue down the pipeline during subsequent clock cycles. Typically, additional instructions enter the IF stage 12 during subsequent clock cycles respectively. The number of stages in the pipeline 4 may define the number of instructions that the pipeline 4 may service simultaneously.

The different stages of the pipeline 4 may operate as follows. Instructions may be fetched during the IF stage 12 by a fetch unit 13 and decoded from instruction registers 15 during a decode (DEC) stage 14. During an address calculation (AC) stage 18, one or more data address generators 19 may calculate any memory addresses used to perform the operation.

During the execution stages 22A–22N, execution units 23 may perform specified operations such as, for example, adding or multiplying two numbers. The execution units 23 may contain specialized hardware for performing the operations including, for example, one or more arithmetic logic units (ALU's), floating-point units (FPU) and barrel shifters, although the scope of the present invention is not limited in this respect. A variety of data may be applied to the execution units 23 such as the addresses generated by the data address generator 19, data retrieved from memory or data retrieved from data registers. During the write back stage (WB) 30, results may be written to a memory location or data registers such as architectural registers 32. The stages of the pipeline 4 may include one or more storage circuits, such as a flip-flop, for storing data.

The architectural registers 32 are generally loaded once an instruction has finished being processed in the pipeline 4 and thus, "committed" to the system. This typically occurs, e.g., at the conclusion of WB stage 30. Therefore, architectural registers 32 are generally written several clock cycles after an instruction enters the pipeline 4.

There are many scenarios, however, where it may be advantageous to access data associated with an instruction before the instruction has committed. For this reason, the pipeline 4 may implement a future file comprising one or more speculative registers 34 used to speculate or "predict" a value for the architectural registers 32. Generally, the speculative registers 34 may be written with data associated with an instruction before the instruction has committed. The speculative registers 34 are written from the data address generator 19.

For instance, subsequent instructions in an instruction stream may use the results of previous instructions. Without a future file, subsequent instructions may need to be stalled until the previous instruction's results have been written to the architectural registers 32. In addition, without a future file, instructions that are part of an instruction loop may not be identified as such until a loop setup instruction's results have been written to the architectural registers 32. Implementing a future file may improve system performance in these and other scenarios.

A restore controller 35 may send an Y bit signal to the speculative registers 34 to indicate a restoration operation is to be performed. The values in the architectural registers 32 are use to restore the speculative registers 34.

Figure 3:
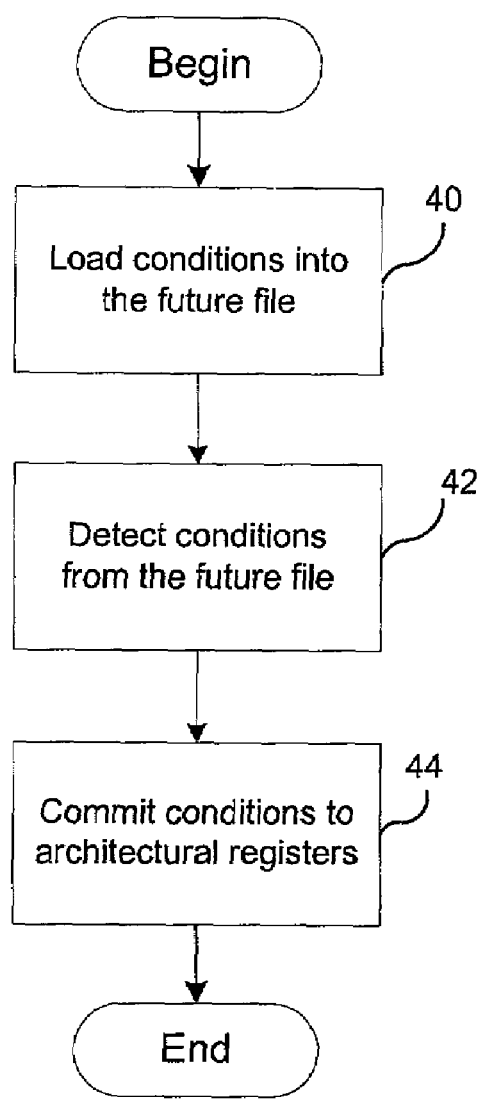
FIG. 3 is a flow diagram illustrating the timing advantages realized by the use of a future file according to an embodiment of the invention.

FIG. 3 is a flow diagram illustrating the timing advantages realized by the use of a future file. As shown in FIG. 3, one or more conditions may be loaded into the future file (40). These conditions may then be detected (42) before the instruction that caused the conditions to be written to future file has committed (44).

Along with all the advantages, implementing a future file also introduces several challenges. For instance, one challenge introduced by the use of future file arises because the data in the future file may need to be restored. If the pipeline 4 must service an event (e.g., an interrupt or an exception), the pipeline's current operations may need to be terminated. If the termination occurs after one or more of the speculative registers 34 in the future file has been written, but before the respective architectural counterparts 32 have been written, then the value of one or more of the speculative registers 34 may be inconsistent with that of the corresponding architectural register 32. In such a case, the future file may require restoration. In other words, because data is written to the future file early, a termination in the pipeline 4 before the instruction has committed may require a restoration of the future file.

Typically, restoring the future file occurs during a single clock cycle. For instance, during the single clock cycle, an architectural state may be written to the future file. In other words, the speculative registers 34 in the future file may be written with the value of the respective architectural counterpart. This may ensure that following a termination, the values of the speculative registers 34 and the corresponding architectural registers 32 are consistent.

Power consumption is a paramount concern in designing a processor. It is advantageous to reduce power consumption during a clock cycle. Peak power consumption refers to the maximum amount of power that is used by the processor during a clock cycle. In some instances, performing a particular task over the course of more than one clock cycle may reduce peak power consumption.

Figure 4:
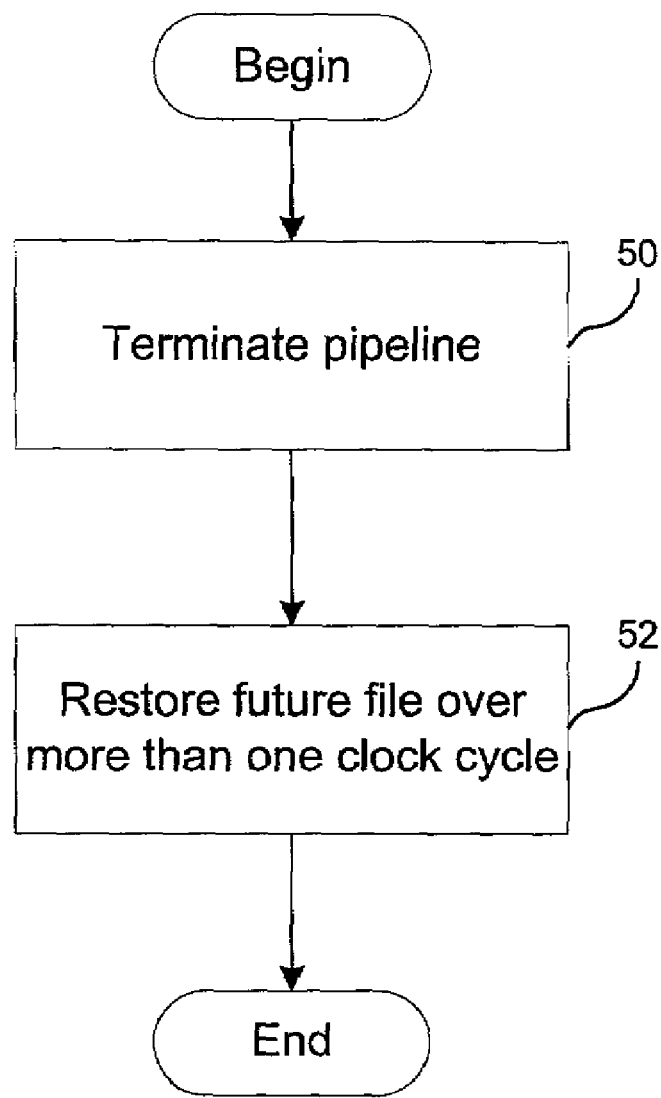
FIG. 4 is a flow diagram illustrating a mode of operation involving restoration of a future file according to an embodiment of the invention.

FIG. 4 is a flow diagram illustrating a mode of operation involving restoration of the future file. As shown in FIG. 4, when a pipeline is terminated (50), the future file may be restored over more than one clock cycle (52).

The future file may comprise a single speculative register, or alternatively, may comprise any number of speculative registers. Restoring the future file over more than one clock cycle (52) may comprise restoring one or more speculative registers over more than one clock cycle. Alternatively, restoring the future file over more than one clock cycle may comprise restoring one or more speculative registers in the future file during a first clock cycle and restoring one or more other speculative registers during a subsequent clock cycle or subsequent clock cycles.

Peak power consumption may be reduced with no reduction in processing speed. Typically, if a task is performed over more than one clock cycle, the processor 2 may operate more slowly than it would if the same task were performed over a single clock cycle. However, if the processor 2 experiences "down time" such as a stall, one or more instruction slots in the pipeline may be empty. In such a case, performance of a task may be spread over more than one clock cycle without reducing processing speed.

When an instruction in a pipeline is terminated, subsequent instructions in the pipeline may be allowed to finish execution without any new instructions entering the pipeline. This is referred to as a "flush." Referring again to FIG. 2, if an instruction in EX. 1 stage 22A is terminated, subsequent instructions in the subsequent stages (22N, 30) may be allowed to finish execution. The number of clock cycles that it takes to flush the pipeline may depend both on the number of stages in the pipeline, and where in the pipeline a termination occurs. For instance, if a termination occurs in the fifth stage of an eight-stage pipeline, a flush would take three clock cycles.

A future file may need to be restored following a termination of an instruction. Moreover, a flush of the pipeline following a termination of an instruction may mandate that no new instructions may enter the pipeline for more than one clock cycle. Therefore, performing a restoration of the future file may occur over the number of clock cycles that it takes to flush the pipeline. In this manner, the time it takes to perform the flush may be efficiently used to reduce the peak power consumption of the processor without any performance penalty.

Figure 5:
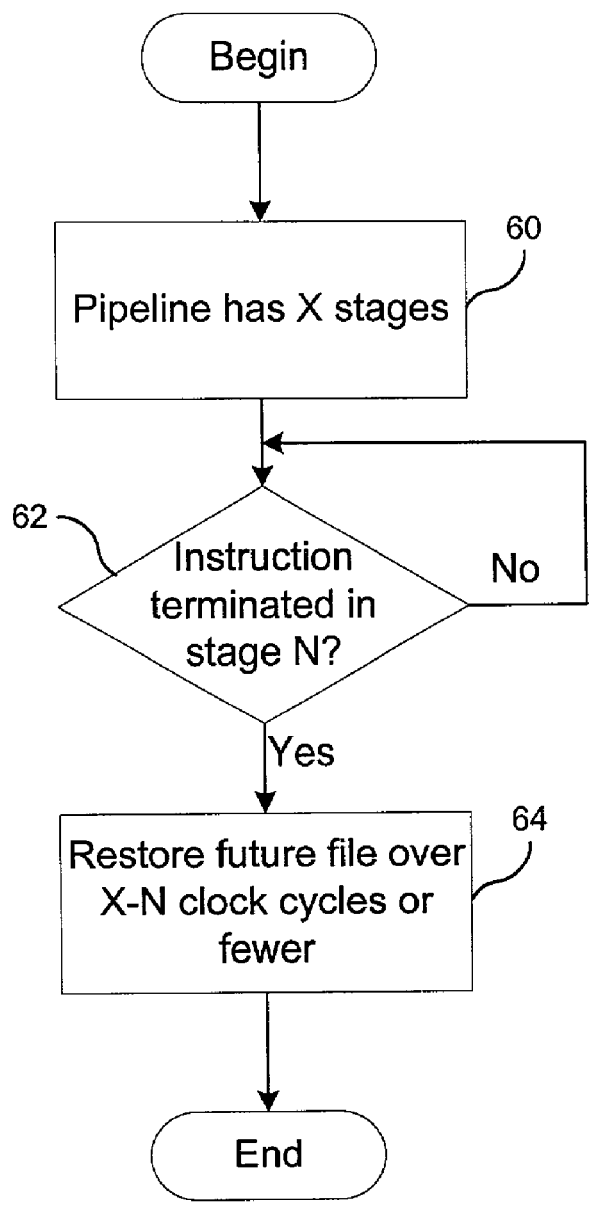
FIG. 5 is another flow diagram illustrating a mode of operation involving restoration of a future file according to an embodiment of the invention.

FIG. 5 is a flow diagram illustrating a mode of operation involving restoration of a future file according to an embodiment of the invention. As shown, a pipeline may have a defined number of stages X (60). If an instruction is terminated in stage N (62), then the future file may be restored over a time period of X-N clock cycles or fewer (64). X-N clock cycles may be the time it takes to flush the pipeline.

Figure 6:
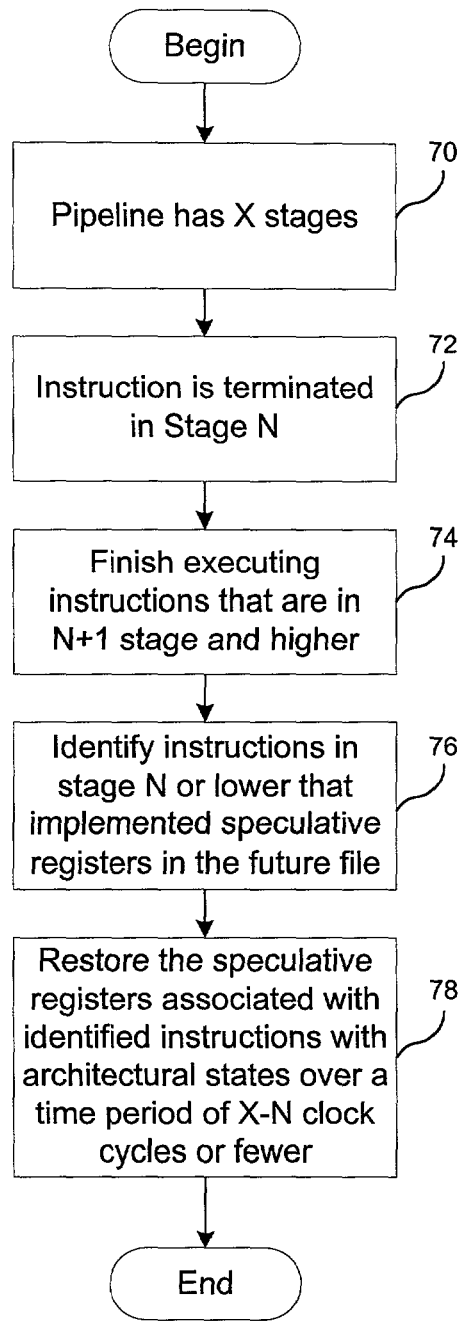
FIG. 6 is yet another flow diagram illustrating a mode of operation involving restoration of a future file according to an embodiment of the invention.

FIG. 6 is another flow diagram illustrating a mode of operation involving restoration of a future file according to an embodiment of the invention. As shown in FIG. 6, a pipeline may have X stages (70), and an instruction may be terminated in stage N (72). At that point, the pipeline may finish executing instructions that are in an N+1$^{th}$ stage or higher (74). Instructions in stage N or lower that implemented speculative registers in the future file may be identified (76), and the speculative registers associated with the identified instructions may be restored over more than one clock cycle. For instance, the speculative registers associated with the identified instructions may be restored over X-N clock cycles or fewer (78).

Various embodiments of the invention have been described. For example, various peak power reduction techniques for use in restoring a future file have been described for implementation within a processor. The processor may be implemented in a variety of systems including general purpose computing systems, digital processing systems, laptop computers, personal digital assistants (PDA's) and cellular phones. In such a system, the processor may be coupled to a memory device, such as a FLASH memory device or a static random access memory (SRAM) that stores an operating system and other software applications. These and other embodiments are within the scope of the following claims.

What is claimed is:

1. A method comprising:
    reducing peak power consumption in a processor which has a future file and which is capable of restoring two or more registers of the future file in a single clock cycle and would do so at a first peak power consumption level, by restoring two or more registers of the future file over more than one clock cycle when a termination occurs in the processor at a second peak power consumption level that is lower than the first peak power consumption level.

2. The method of claim 1, wherein the processor is a pipelined processor.

3. The method of claim 1, wherein restoring two or more registers of the future file comprises updating two or more speculative registers in the future file with architectural values.

4. The method of claim 1, wherein more than one clock cycle comprises two clock cycles.

5. The method of claim 1, wherein more than one clock cycle comprises three clock cycles.

6. The method of claim 1, wherein the processor is a pipelined processor and more than one clock cycle comprises a number of clock cycles required to flush the processor.

7. An apparatus comprising:
a control unit coupled to a first set of registers, a second set of registers and a pipeline, the control unit adapted to restore two or more registers of the first set of registers with data contained in the second set of registers over more than one clock cycle and at a first peak power consumption level following a termination of an instruction in the pipeline although the control unit has the capability of restoring two or more registers of the first set of registers with data contained in the second set of registers in one clock cycle and would do so at a second peak power level that is higher than the first peak power level.

8. The apparatus of claim 7, wherein each register in the second set of registers is associated respectively with a register in the first set of registers.

9. The apparatus of claim 7, wherein more than one clock cycle comprises two clock cycles.

10. The apparatus of claim 7, wherein more than one clock cycle comprises three clock cycles.

11. The apparatus of claim 7, wherein the control unit is further adapted to flush the pipeline following the termination of the instruction in the pipeline.

12. The apparatus of claim 11, wherein more than one clock cycle comprises the number of clock cycles required by the processor to flush the pipeline.

13. The apparatus of claim 12, the control unit further adapted to restore at least one register in the first set of registers after the pipeline has been flushed.

14. The apparatus of claim 7 wherein the pipeline is an X-stage pipeline, the control unit adapted to restore the first set of registers with data contained in the second set of registers over X-N clock cycles or fewer, following a termination of an instruction in an $N^{th}$ stage of the pipeline.

15. A system comprising:
a static random access memory device;
a processor coupled to the static random access memory device, wherein the processor includes a first set of registers, a second set of registers, a pipeline and a control unit adapted to restore two or more of the registers in the first set of registers with values in the second set of registers over more than one clock cycle and at a first peak power consumption level if a termination occurs in the pipeline although the processor is capable of restoring the first set of registers with values in the second set of registers in one clock cycle and would do so at a second peak power consumption level that is higher than the first peak power level.

16. The system of claim 15, wherein more than one clock cycle comprises two clock cycles.

17. The system of claim 15, wherein more than one clock cycle comprises three clock cycles.

18. The system of claim 15, wherein the control unit is further adapted to flush the pipeline following the termination of the instruction in the pipeline.

19. The system of claim 18, wherein more than one clock cycle comprises the number of clock cycles required by the processor to flush the pipeline.

20. The system of claim 19, the control unit further adapted to restore at least one register in the first set of registers after the pipeline has been flushed.

21. The system of claim 15, wherein the pipeline is an X-stage pipeline, and wherein the control unit is adapted to restore the first set of registers with data contained in the second set of registers over X-N clock cycles or fewer, following a termination of an instruction in an $N^{th}$ stage of the pipeline.

* * * * *